United States Patent Office 2,978,368
Patented Apr. 4, 1961

2,978,368
CORROSION INHIBITION IN FERROUS METALS

Geoffrey Winton Horsley, Wantage, and Brian Reginald Thomas Frost and John Thomas Maskrey, Abingdon, England, assignors to United Kingdom Atomic Energy Authority, London, England No Drawing. Filed July 3, 1958, Ser. No. 746,328

Claims priority, application Great Britain July 3, 1957

4 Claims. (Cl. 148—16.6)

The present invention relates to corrosion inhibition of ferrous metals in contact with liquid metals, for example, bismuth.

It is known to protect steel vessels containing liquid metals by dissolving substances such as zirconium and titanium, known as nitride formers, in the liquid metals. The nitride formers combine with nitrogen in the steel to form a corrosion resistant layer of nitride on the steel. Unfortunately, this layer is apt to flake off in the course of time, producing gaps in the protective layer in which pitting of the steel occurs. The gaps are not readily self-healing since the nitrogen in the steel available for combination with the nitride former becomes exhausted.

It is an object of the present invention to provide a method of corrosion inhibition whereby said corrosion-resistant nitride layer is substantially self-healing.

According to the present invention a method of inhibiting corrosion of one surface of a ferrous metal plate when said surface is in contact with a liquid metal containing a nitride former comprises forming a layer of a nitride of the ferrous metal on the opposite surface of said plate.

The nitrogen ions in this layer migrate through the ferrous metal to its interface with the liquid metal, combine with the nitride former and so the protective layer of nitride is renewed. The layer may be formed and continuously replenished by feeding ammonia continuously to said opposite surface if the ferrous metal is maintained at a temperature of 500° C.–600° C.

In an example, a jacketed steel vessel contained liquid bismuth to which had been added 500 p.p.m. of zirconium and 500 p.p.m. of calcium. The calcium acted as a getter of any non-metallic impurities, such as oxygen and chlorine, in the bismuth which might react with the zirconium.

The steel of the vessel was 2¼% Cr—1% Mo superheated steel about .064 in. thick and the bismuth was more than 99.99% pure. Both the zirconium and the calcium were more than 99.0% pure.

The vessel was heated by electric heating elements to maintain the bismuth at 550° C. and dry ammonia was supplied to the jacket, a small bleed ensuring that the ammonia was completely replaced by fresh ammonia about every 24 hours.

The interior surface of the vessel was polished and the exterior, within the jacket, was shot-blasted.

After 17 weeks the vessel was emptied and the inner surface examined microscopically. Some pitting corrosion had occurred but the pits had been sealed-off by the growth of a new film.

An experiment with a similar vessel to which no ammonia was supplied resulted in severe pitting corrosion and no growth of new film.

We claim:

1. A method of inhibiting corrosion of a ferrous metal plate containing nitrogen and having a surface in contact with a liquid metal, comprising adding to the liquid metal an element which combines with the nitrogen in the ferrous metal plate to form a corrosion resistant nitride layer on said surface, contacting the opposite surface of the ferrous metal plate with a material which forms a nitride of the ferrous metal, and maintaining a layer of the ferrous metal nitride on said opposite surface during the time said liquid metal is in contact with the ferrous metal plate, whereby nitrogen ions migrate from said opposite surface to said first-named surface to maintain the nitride layer on said first-named surface.

2. A method according to claim 1 wherein said opposite surface of the ferrous metal plate is contacted with ammonia and the ferrous metal nitride layer is maintained by continuously feeding ammonia to said opposite surface while the temperature of the ferrous metal plate is maintained at about 500–600° C.

3. A method according to claim 2 wherein said element added to the liquid metal is selected from the group consisting of zirconium and titanium.

4. A method according to claim 3 wherein the liquid metal is bismuth.

References Cited in the file of this patent

UNITED STATES PATENTS 2,437,249    Floe ------------------ Mar. 9, 1948